US012692569B2

(12) United States Patent
Zaizen et al.

(10) Patent No.: US 12,692,569 B2
(45) Date of Patent: Jul. 28, 2026

(54) METHOD FOR PRODUCING NON-ORIENTED ELECTRICAL STEEL SHEET

(71) Applicant: JFE STEEL CORPORATION, Tokyo (JP)

(72) Inventors: Yoshiaki Zaizen, Tokyo (JP); Tomoyuki Okubo, Tokyo (JP); Yoshihiko Oda, Tokyo (JP); Yukino Miyamoto, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 765 days.

(21) Appl. No.: 17/281,614

(22) PCT Filed: Jul. 4, 2019

(86) PCT No.: PCT/JP2019/026617
§ 371 (c)(1),
(2) Date: Mar. 31, 2021

(87) PCT Pub. No.: WO2020/090156
PCT Pub. Date: May 7, 2020

(65) Prior Publication Data
US 2021/0388456 A1 Dec. 16, 2021

(30) Foreign Application Priority Data
Oct. 31, 2018 (JP) ................................ 2018-205360

(51) Int. Cl.
*C21D 9/46* (2006.01)
*C21D 6/00* (2006.01)
(Continued)

(52) U.S. Cl.
CPC ............... *C21D 9/46* (2013.01); *C21D 6/005* (2013.01); *C21D 6/008* (2013.01); *C21D 8/1222* (2013.01);
(Continued)

(58) Field of Classification Search
None
See application file for complete search history.

(56) References Cited

U.S. PATENT DOCUMENTS

2017/0314090 A1 11/2017 Okubo et al.
2018/0030558 A1 2/2018 Okubo et al.
(Continued)

FOREIGN PATENT DOCUMENTS

CN 107058874 A 8/2017
CN 107058875 A 8/2017
(Continued)

OTHER PUBLICATIONS

May 26, 2022 Office Action issued in Chinese Patent Application No. 201980071449.8.
(Continued)

*Primary Examiner* — Brian D Walck
(74) *Attorney, Agent, or Firm* — Oliff PLC

(57) ABSTRACT

A non-oriented electrical steel sheet is produced by subjecting a steel slab containing, in mass %, C: not more than 0.0050%, Si: 1.0 to 6.5%, Mn: 0.05 to 2.0%, S: not more than 0.0050%, Al: not more than 0.01%, N: not more than 0.0050%, Ti: not more than 0.0030%, Nb: not more than 0.0030% and O: not more than 0.0050% to a hot rolling, a cold rolling and a finish annealing, the finish annealing conducted under conditions that a soaking temperature T (° C.) satisfies the following equation (1):
(Continued)

$$\frac{(8000+400\times \mathrm{Si(mass\ \%)})}{\{(-\log(\mathrm{Al(mass\ \%)}\times \mathrm{N(mass\ \%)})+1.7+0.2\times \mathrm{Si(mass\ \%)}\}}-273.15\leq T\leq 1200, \quad (1)$$

and an atmosphere in the finish annealing is a mixed gas composed of one or more selected from nitrogen, hydrogen and noble gas with a nitrogen content of not more than 50 vol % and a dew point of not higher than −20° C., whereby a non-oriented electrical steel sheet achieving a high magnetic flux density and a low iron loss is produced.

21 Claims, 3 Drawing Sheets

(51) Int. Cl.

| | |
|---|---|
| ***C21D 8/12*16** | (2026.01) |
| ***C21D 8/1244*** | (2026.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/08*** | (2006.01) |
| ***C22C 38/12*** | (2006.01) |
| ***C22C 38/14*** | (2006.01) |
| ***C22C 38/20*** | (2006.01) |
| ***C22C 38/26*** | (2006.01) |
| ***C22C 38/28*** | (2006.01) |
| ***C22C 38/34*** | (2006.01) |
| ***C22C 38/42*** | (2006.01) |
| ***C22C 38/48*** | (2006.01) |
| ***C22C 38/50*** | (2006.01) |
| ***C22C 38/60*** | (2006.01) |
| ***H01F 1/147*** | (2006.01) |

(52) U.S. Cl.
CPC ......... *C21D 8/1233* (2013.01); *C21D 8/1266* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/20* (2013.01); *C22C 38/26* (2013.01); *C22C 38/28* (2013.01); *C22C 38/34* (2013.01); *C22C 38/42* (2013.01); *C22C 38/48* (2013.01); *C22C 38/50* (2013.01); *C22C 38/60* (2013.01); *H01F 1/147* (2013.01); *C22C 2202/02* (2013.01)

(56) References Cited

U.S. PATENT DOCUMENTS

| | | | |
|---|---|---|---|
| 2018/0230564 | A1 | 8/2018 | Nakajima et al. |
| 2019/0316239 | A1 | 10/2019 | Yashiki et al. |

FOREIGN PATENT DOCUMENTS

| | | | |
|---|---|---|---|
| CN | 107075640 | A | 8/2017 |
| CN | 107164690 | A | 9/2017 |
| CN | 107208171 | A | 9/2017 |
| CN | 107849632 | A | 3/2018 |
| CN | 108350518 | A | 7/2018 |
| EP | 3214195 | A1 | 9/2017 |
| EP | 3378959 | A1 | 9/2018 |
| JP | H08-60252 | A | 3/1996 |
| JP | H08-60310 | A | 3/1996 |
| JP | H08-60311 | A | 3/1996 |
| JP | H11-343544 | A | 12/1999 |
| JP | 2001-316729 | A | 11/2001 |
| JP | 2001-323351 | A | 11/2001 |
| JP | 2002-146491 | A | 5/2002 |
| JP | 2016-47943 | A | 4/2016 |
| JP | 6194866 | B2 | 9/2017 |
| TW | 201829803 | A | 8/2018 |

OTHER PUBLICATIONS

Sep. 5, 2022 Office Action issued in Korean Patent Application No. 10-2021-7010087.
Mar. 8, 2022 Office Action issued in Canadian Patent Application No. 3,116,570.
Sep. 24, 2019 International Search Report issued in International Patent Application No. PCT/JP2019/026617.
Sep. 2, 2020 Office Action issued in Japanese Patent Application No. 2019-554425.
Mar. 9, 2021 Office Action issued in Japanese Patent Application No. 2019-554425.
Dec. 27, 2019 Office Action issued in Taiwanese Patent Application No. 108133984.
Oct. 22, 2021 Search Report issued in European Patent Application No. 19879584.1.
Manfred Kodym et al. “Spurenelemente Im Stahl—Möglichkeiten Zur Beeinflussung Im Schmelzbetrieb”. Spurenelemente In Staehlen, Verlag Stahleisen, Duesseldorf, DE, Jan. 1, 1985, pp. 19-22.
“Residual Elements in Steel”. Internet Citation, Jul. 1, 2007, URL: http://www.keytometals.com/page.aspx?ID-CheckArticle&site=kts&LN=DE&NM=205 [retrieved on Jan. 5, 2015]].

METHOD FOR PRODUCING NON-ORIENTED ELECTRICAL STEEL SHEET

TECHNICAL FIELD

This invention relates to a method for producing a non-oriented electrical steel sheet, and more particularly to a method for producing a non-oriented electrical steel sheet with a low iron loss and a high magnetic flux density used in an automotive motor.

BACKGROUND ART

For the recent demand for global warming prevention and energy saving, hybrid electric vehicles (HEV) using an engine and a motor in combination, electric vehicles (EV) driven only by an electric motor and fuel cell vehicles (FCEV) have been developed in the automotive field. Moreover, it has been strongly demanded that a driving motor for HEV, EV or the like and further industrial induction motors have high efficiency due to tighter environmental regulations.

An iron core material for such a motor as the driving motor of HEV, EV or the like or the induction motor generally uses a non-oriented electrical steel sheet, which is desirable to be low in iron loss to attain the high efficiency of the motor. It has been attempted to reduce the iron loss of the non-oriented electrical steel sheet by adding mainly such elements as Si, Al and the like that increases the specific resistance or by decreasing the sheet thickness to reduce an eddy current loss. Since the addition of the large amount of the alloying element brings about decrease in the saturated magnetic flux density, however, the decrease of the magnetic flux density cannot be avoided even though the iron loss can be decreased. The decrease in the magnetic flux density causes increase in copper loss in the motor, leading to decrease in the motor efficiency. Moreover, it is necessary to decrease the thickness of the hot-rolled sheet or increase cold rolling reduction in order to reduce the sheet thickness, causing a problem that the rolling load is increased or the productivity is decreased. Therefore, it is desired to develop a different method that can attain high magnetic flux density and low iron loss of the non-oriented electrical steel sheet.

As a technique of producing a non-oriented electrical steel sheet with low iron loss, for example, Patent Literature 1 discloses a method of increasing the specific resistance of steel by adding Cr by not less than 1.5 wt % but not more than 20 wt %.

CITATION LIST

Patent Literature

Patent Literature 1: JP-A-H11-343544

SUMMARY OF INVENTION

Technical Problem

Since Cr is an element decreasing the saturated magnetic flux density, the technique disclosed in Patent Literature 1 cannot achieve both high magnetic flux density and low iron loss at the same time and therefore cannot respond sufficiently to the recent severe demands for the non-oriented electrical steel sheet.

The invention is made in consideration of the above problem inherent to the conventional technique, and an object thereof is to propose a method for producing a non-oriented electrical steel sheet capable of attaining both high magnetic flux density and low iron loss stably.

Solution to Problem

The inventors have made various studies to solve the above problem, focusing on the influence of impurities upon the magnetic properties of the non-oriented electrical steel sheet. As a result, they have found out that the iron loss can be decreased without lowering the magnetic flux density, by reducing a nitrogen content in a steel sheet sufficiently after finish annealing, and the invention has been accomplished.

The invention is based on the above knowledge and proposes a method for producing a non-oriented electrical steel sheet by hot rolling a steel slab having a chemical composition comprising C: not more than 0.0050 mass %, Si: 1.0 to 6.5 mass %, Mn: 0.05 to 2.0 mass %, S: not more than 0.0050 mass %, Al: not more than 0.01 mass %, N: not more than 0.0050 mass %, Ti: not more than 0.0030 mass %, Nb: not more than 0.0030 mass %, O: not more than 0.0050 mass % and the remainder being Fe and inevitable impurities, subjecting the hot-rolled sheet to a single cold rolling or two or more cold rollings having an intermediate annealing interposed therebetween to have a final sheet thickness, and to a finish annealing, in which a soaking temperature T (° C.) in the finish annealing satisfies the following equation (1):

$$\frac{(8000+400\times \mathrm{Si(mass\ \%)})}{\{(-\log(\mathrm{Al(mass\ \%)}\times \mathrm{N(mass\ \%)})+1.7+0.2\times \mathrm{Si(mass\ \%)}\}}-273.15\leq T\leq 1200, \quad (1)$$

and an atmosphere in the finish annealing is a mixed gas containing one or more selected from $N_2$, $H_2$ and a noble gas and having a $N_2$ content of not more than 50 vol % and a dew point of the atmosphere of not higher than −20° C.

The steel slab used in the method for producing a non-oriented electrical steel sheet according to the invention further contains P: 0.03 to 0.20 mass %, in addition to the above chemical composition.

Also, the steel slab used in the method for producing a non-oriented electrical steel sheet according to the invention further contains one or two selected from Sn: 0.005 to 0.20 mass % and Sb: 0.005 to 0.20 mass %, in addition to the above chemical composition.

Further, the steel slab used in the method for producing a non-oriented electrical steel sheet according to the invention further contains one or more selected from Ca, Mg and REM by 0.0005 to 0.020 mass % in total, in addition to the above chemical composition.

Moreover, the steel slab used in the method for producing a non-oriented electrical steel sheet according to the invention further contains one or more selected from Cu, Ni and Cr by 0.01 to 1.0 mass %, in addition to the above chemical composition.

Advantageous Effects of Invention

According to the invention, it is possible to produce a non-oriented electrical steel sheet with low iron loss stably without causing decrease in magnetic flux density. Therefore, the invention can stably provide a non-oriented electrical steel sheet suitable as a core material of a motor for a hybrid electric vehicle, an electric vehicle, a cleaner, a high-speed generator, a compressor of an air-conditioner, a machine tool and the like.

DESCRIPTION OF EMBODIMENTS

There will be first described an experiment, which have led to the development of the invention.

Experiment 1

A steel having a chemical composition comprising C: 0.0029 mass %, Si: 2.3 mass %, Mn: 0.7 mass %, P: 0.01 mass %, S: 0.0022 mass %, Al: 0.001 mass %, N: 0.0034 mass %, Ti: 0.0008 mass %, Nb: 0.0009 mass %, O: 0.0034 mass % and the remainder being Fe and inevitable impurities, provided that Al content is slight, is melted in a vacuum furnace and cast into a steel ingot. The steel ingot is then hot rolled to 2.0 mm, pickled, cold rolled to a final sheet thickness of 0.25 mm and subjected to a finish annealing at 1050° C. for 10 seconds under two conditions of 100% $N_2$ atmosphere (dew point: −50° C.) and vacuum (vacuum degree: $10^{-4}$ torr). Thereafter, a test specimen with a width of 30 mm and a length of 180 mm is taken out from the sheet to measure magnetic properties by an Epstein test.

Figure 1:
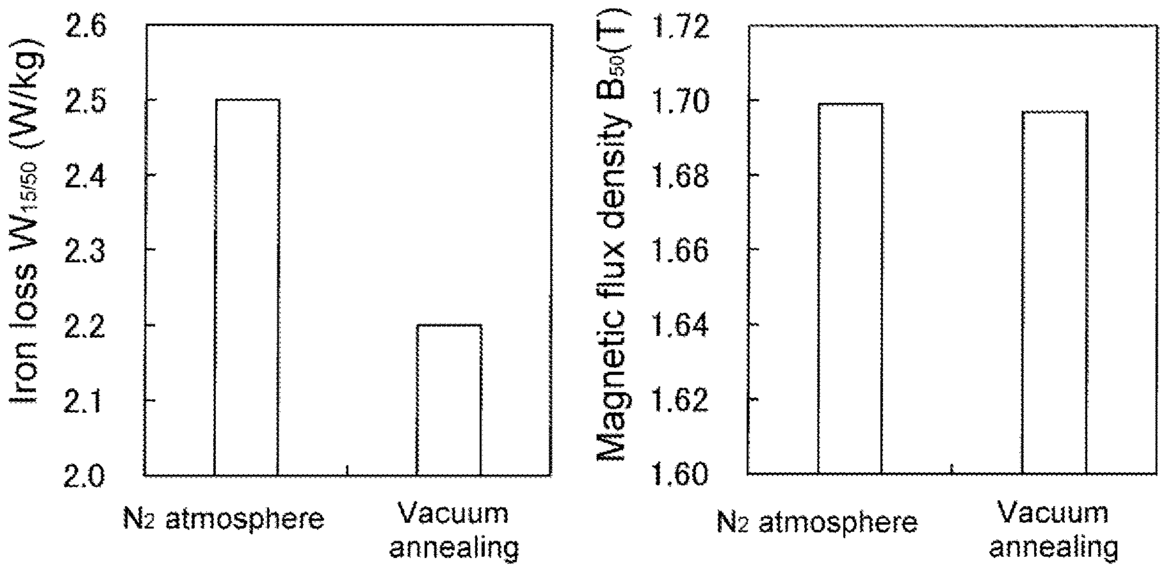
FIG. 1 is a graph showing an influence of an atmosphere in finish annealing upon magnetic properties after finish annealing.
Figure 2:
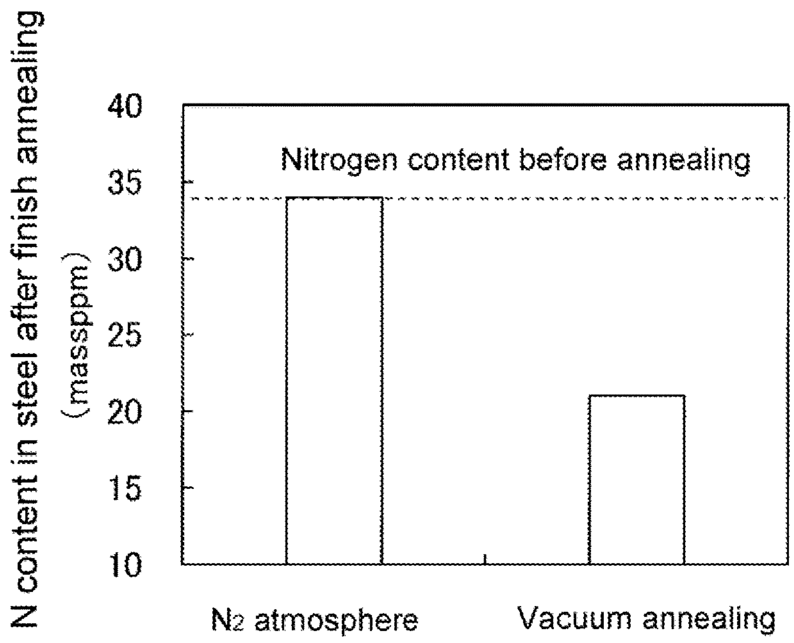
FIG. 2 is a graph showing an influence of an atmosphere in finish annealing upon a nitrogen content in steel after finish annealing.

The measurement results are shown in FIG. 1. The magnetic flux density $B_{50}$ is approximately equal when the atmosphere of the finish annealing is $N_2$ atmosphere and when it is vacuum, although the iron loss $W_{15/50}$ is much higher in the $N_2$ atmosphere than under vacuum. In order to examine the cause for the difference in the iron loss, the N content in steel of each test specimen is analyzed, and as shown in FIG. 2, it is confirmed that the N content in steel of the test specimen that has been annealed in the $N_2$ atmosphere has not changed before and after the finish annealing, while the N content in steel is largely decreased after the finish annealing in the test specimen that has been annealed under vacuum.

Figure 3:
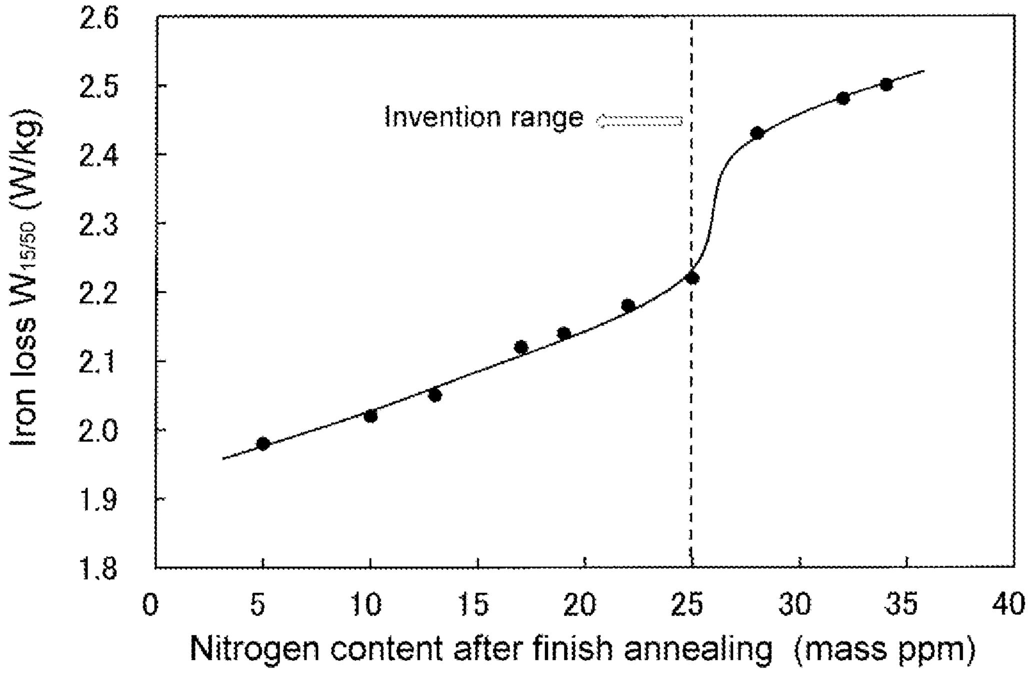
FIG. 3 is a graph showing an influence of nitrogen content in steel after finish annealing upon an iron loss $W_{15/50}$.

In order to examine the relation between the N content in steel and the iron loss $W_{15/50}$ after the finish annealing, the cold-rolled sheet used in the above experiment (thickness: 0.25 mm) is subjected to finish annealing under vacuum conditions with varying vacuum degrees. The test results are shown in FIG. 3, where the iron loss lowers as the nitrogen content in steel after the finish annealing decreases. Especially, when the nitrogen content in steel is not more than 25 massppm, the iron loss is remarkable decreased.

Although the mechanism how the iron loss lowers by the decrease in the N content in steel after the finish annealing is not sufficiently clear at present, the inventors consider as follows:

In the steel sheet having the low Al content, so-called Al-less steel sheet, used in the above experiment, it is considered that N in steel forms and precipitates a nitride such as $Si_3N_4$ or the like after the finish annealing and blocks domain wall displacement, thereby to increases hysteresis loss. Therefore, the hysteresis loss can be lowered by reducing the N content by some means in the finish annealing and thereby decreasing nitride such as $Si_3N_4$ or the like. Also, it can be expected that the domain wall displacement in the product sheet becomes easy due to decrease in the lattice strain by the decrease in the content of the dissolved N itself, whereby the hysteresis loss can be lowered.

<Experiment 2>

Next, based on the above experimental results, the following experiment is performed to examine the influence of the nitrogen partial pressure of the atmosphere in the finish annealing upon the magnetic properties.

A steel comprising C: 0.0023 mass %, Si: 3.3 mass %, Mn: 0.2 mass %, P: 0.01 mass %, S: 0.0017 mass %, Al: 0.003 mass %, N: 0.0031 mass %, Ti: 0.0012 mass %, Nb: 0.0010 mass %, O: 0.0024 mass % and the remainder being Fe and inevitable impurities is melted in a vacuum furnace, cast into a steel ingot and hot rolled to form a hot-rolled sheet having a sheet thickness of 1.9 mm. The hot-rolled sheet is subjected to a hot-band annealing at 1000° C. for 30 seconds, pickled, cold rolled to form a cold-rolled sheet having a sheet thickness of 0.25 mm and subjected to a finish annealing at 1050° C. for 10 seconds (dew point: −45° C.) to form a product sheet. The nitrogen content in the mixed atmosphere of hydrogen and nitrogen used in the finish annealing is made varied within a range of 0 to 100 vol %.

Then, L- and C-direction samples with a width of 30 mm and a length of 180 mm are taken out from the product sheet in the rolling direction (L-direction) and the direction perpendicular to the rolling direction (C-direction) to measure an iron loss $W_{15/50}$ in the L+C directions by an Epstein test.

Figure 4:
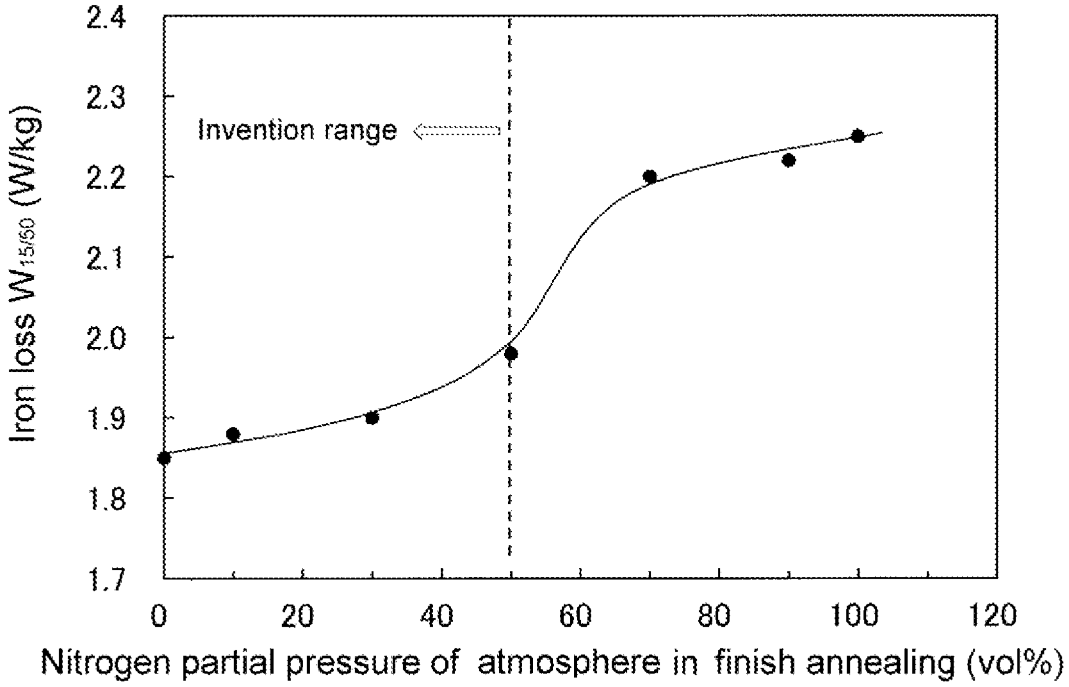
FIG. 4 is a graph showing a graph showing an influence of nitrogen partial pressure of an atmosphere in finish annealing upon an iron loss $W_{15/50}$.

FIG. 4 shows the measurement results. As seen from FIG. 4, an excellent iron loss property is obtained by reducing the nitrogen partial pressure of the atmosphere in the finish annealing to not more than 50 vol %.

Experiment 3

The following experiment is performed to examine an influence of the dew point of the atmosphere in the finish annealing upon the iron loss in order to further reduce the iron loss.

A steel comprising C: 0.0027 mass %, Si: 3.6 mass %, Mn: 0.5 mass %, P: 0.01 mass %, S: 0.0019 mass %, Al: 0.003 mass %, N: 0.0029 mass %, Ti: 0.0011 mass %, Nb: 0.0012 mass %, O: 0.0029 mass % and the remainder being Fe and inevitable impurities is melted in a vacuum furnace, cast into a steel ingot and hot rolled to form a hot-rolled sheet having a sheet thickness of 1.8 mm. The hot-rolled sheet is subjected to a hot-band annealing at 950° C. for 30 seconds, pickled and cold rolled to form a cold-rolled sheet having a sheet thickness of 0.20 mm, which is subjected to a finish annealing at 1050° C. for 10 seconds to form a product sheet. The dew point of the atmosphere in the finish annealing is varied within a range of 30° C. to −60° C.

Then, test specimens with a width of 30 mm and a length of 180 mm are taken out from the product sheet in the rolling direction (L-direction) and the direction perpendicular to the rolling direction (C-direction) to measure an iron loss $W_{15/50}$ in the L+C directions by an Epstein test.

Figure 5:
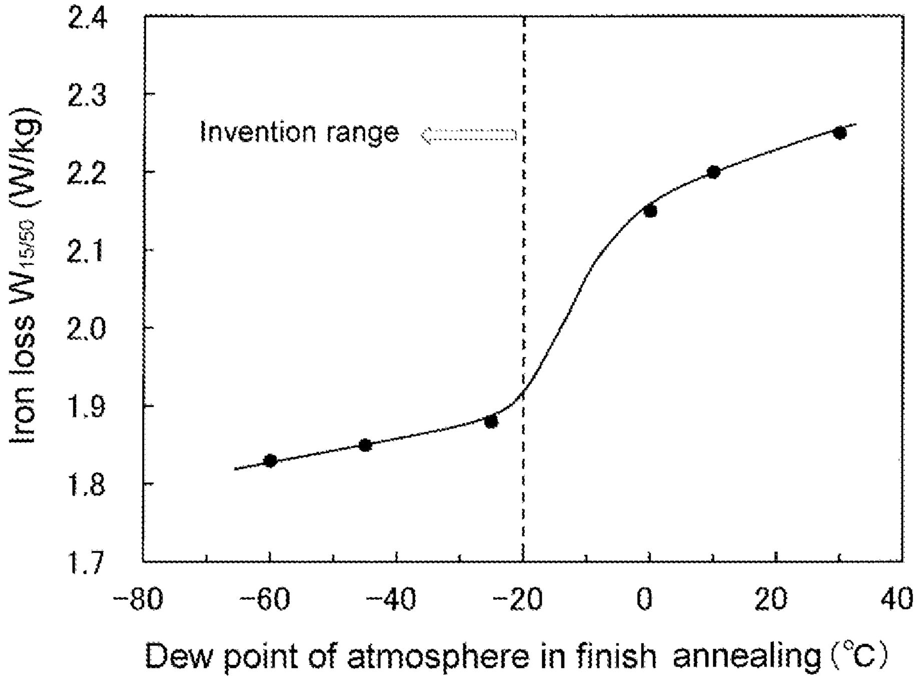
FIG. 5 is a graph showing an influence of a dew point of an atmosphere in finish annealing upon an iron loss $W_{15/50}$.

FIG. 5 shows the results of the above measurement. As seen from FIG. 5, an excellent iron loss property is obtained by decreasing the dew point of the atmosphere in the finish annealing to not higher than −20° C. This is considered due to the fact that as the dew point becomes higher, an oxide layer is formed on the steel sheet surface and acts as a barrier layer to block the diffusion of nitrogen in the finish annealing.

<Experiment 4>

Further, in order to investigate an influence of the soaking temperature in the finish annealing upon the iron loss, the experiment using the cold-rolled sheet obtained in Experiment 3 (sheet thickness: 0.20 mm) is conducted by variously changing the soaking temperature within a range of 900 to 1100° C. to provide a product sheet. In this case, the atmosphere in the finish annealing is at two levels of totally $N_2$ atmosphere (dew point: −50° C.) and totally $H_2$ atmosphere (dew point: −50° C.).

Then, test specimens with a width of 30 mm and a length of 180 mm are taken out from the product sheet in the rolling direction (L-direction) and the direction perpendicular to the rolling direction (C-direction) to measure an iron loss $W_{15/50}$ in the L+C directions by an Epstein test.

Figure 6:
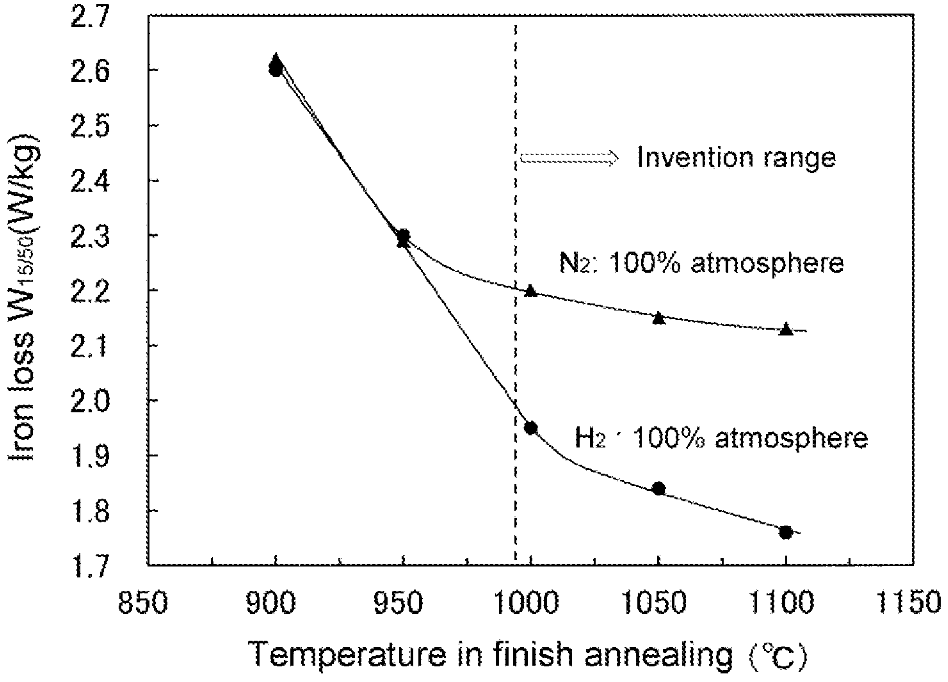
FIG. 6 is a graph showing an influence of an annealing temperature and atmosphere in finish annealing upon an Iron loss $W_{15/50}$.

FIG. 6 shows the results of the above measurement. As seen from FIG. 6, when the finish annealing temperature is not higher than 950° C. although the atmosphere in the finish annealing is $H_2$:100 vol %, the properties is not improved as compared to the case of $N_2$: 100 vol % atmosphere. This is considered due to the fact that the nitrides such as AlN, $Si_3N_4$ precipitated in steel and the like are decomposed and dissolved into steel in the finish annealing. When the annealing temperature is low, the diffusion of nitrogen to the sheet thickness direction is not advanced, and nitrogen in steel is not reduced.

Thus, in order to reduce nitrogen in steel during the finish annealing, therefore, it is necessary to conduct the finish annealing at a temperature higher than that where AlN and $Si_3N_4$ are dissolved. Here, the temperature (° C.) required for dissolving AlN and $Si_3N_4$ is determined by the following equation (1):

$$\frac{(8000 + 400 \times \mathrm{Si(mass\ \%)})}{\{(-\log(\mathrm{Al(mass\ \%)} \times \mathrm{N(mass\ \%)})) + 1.7 + 0.2 \times \mathrm{Si(mass\ \%)}\}} - 273.15 \leq T \leq 1200. \quad (1)$$

When the temperature required for completely dissolving AlN and $Si_3N_4$ in the raw steel material used in Experiment 4 is determined from the equation (1), it is 989° C., which well get into alignment with the result of FIG. 6.

The invention is developed based on the above novel knowledge.

There will be described the reason for limiting the chemical composition of the raw steel material (slab) used in the production of the non-oriented electrical steel sheet according to the invention below.

C: not more than 0.0050 mass %

When remaining in the product sheet, C is a harmful element forming a carbide to cause magnetic aging and deteriorate iron loss property. In particular, the C content exceeding 0.0050 mass % causes the iron loss to remarkably increase due to the magnetic aging. In the invention, therefore, C is limited to not more than 0.0050 mass %. Preferably, it is not more than 0.0040 mass %. Moreover, the lower limit of C is not particularly limited, but is preferable to be about 0.0001 mass % from a viewpoint of decarburization cost reduction in refining process.

Si: 1.0 to 6.5 mass %

Si is an element increasing the specific resistance of steel to thereby reduce the iron loss, and has an effect of increasing the strength of steel by dissolution strengthening. Therefore, Si is contained by not less than 1.0 mass %. On the other hand, when it exceeds 6.5 mass %, slab cracking is caused and it becomes difficult to conduct rolling, so that the upper limit is 6.5 mass %. Preferably, Si falls within the range of 2.0 to 6.0 mass %.

Mn: 0.05 to 2.0 mass %

Mn is an element effective for increasing the specific resistance and strength of steel, like Si, and has an effect of forming a sulfide to improve hot shortness. Hence Mn is contained by not less than 0.05 mass %. On the other hand, when it exceeds 2.0 mass %, slab cracking is caused to deteriorate operability in steel-making process, and thus the upper limit is 2.0 mass %. Preferably, Mn falls within the range of 0.1 to 1.5 mass %.

S: not more than 0.0050 mass %

S becomes sulfide and forms precipitates or inclusions, causing deterioration in productivity (hot rolling property) and magnetic properties of the product sheet, so that less content is more preferable. Thus, the upper limit of S is 0.0050 mass %, and it is preferably not more than 0.0030 mass %.

Al: not more than 0.01 mass %

When Al is contained by exceeding 0.01 mass %, the texture after the finish annealing is randomized and the development of the texture of {100} orientation favorable in the magnetic properties becomes insufficient. Thus, the amount is limited to not more than 0.01 mass %. It is preferably not more than 0.005 mass %, more preferably not more than 0.002 mass %.

N: not more than 0.0050 mass %

N is an element forming a nitride to deteriorate the magnetic properties, and thus N is limited to not more than 0.0050 mass %. Preferably, it is not more than 0.0040 mass %.

Ti, Nb: not more than 0.0030 mass % each

Ti and Nb are harmful elements forming fine precipitates to thereby increase the iron loss. When each element exceeds 0.0030 mass %, the above bad influence becomes remarkable, and thus the upper limit is 0.0030 mass %. Preferably, each element is not more than 0.0020 mass %.

O: not more than 0.0050 mass %

O is a harmful element forming an oxide to deteriorate the magnetic properties, and thus it is limited to not more than 0.0050 mass %. Preferably, it is not more than 0.0040 mass %.

The raw steel material used in the invention may contain the following ingredients, in addition to the above essential ingredients.

P: 0.03 to 0.20 mass %

P segregates into a grain boundary and has an effect of improving the texture after the recrystallization. In order to obtain such an effect, P is necessary to be added by not less than 0.03 mass %. However, when it exceeds 0.20 mass %, not only the above effect is saturated, but also the cold-rolling property is lowered, and thus the upper limit is 0.20 mass %. When P is added, therefore, the addition amount is preferable to fall within the range of 0.03 to 0.20 mass %. More preferably, it is within the range of 0.05 to 0.10 mass %.

Sn: 0.005 to 0.20 mass %, Sb: 0.005 to 0.20 mass %

Sn and Sb have an effect of improving the recrystallization texture to thereby improve the magnetic flux density and the iron loss property. In order to obtain such an effect, each element is necessary to be added by not less than 0.005 mass %. On the other hand, an addition of each element exceeding 0.20 mass % causes the above effect to be saturated. Therefore, when Sn and Sb are added, each amount is preferable to fall within the range of 0.005 to 0.20 mass %. More preferably, it is within the range of 0.01 to 0.1 mass %.

Ca, Mg and REM: 0.0005 to 0.020 mass % in total

Ca, Mg and REM have an effect of forming a stable sulfide to improve the grain growth. In order to obtain such an effect, the addition of not less than 0.0005 mass % is necessary. On the other hand, the addition amount exceeding 0.020 mass % causes the above effect to be saturated. Therefore, when Ca, Mg and REM are added, the total amount is preferable to fall within the range of 0.0005 to 0.020 mass %. More preferably, it is within the range of 0.001 to 0.01 mass %.

Cu, Ni and Cr: 0.01 to 1.0 mass % in total

Cu, Ni and Cr have an effect of increasing the specific resistance of steel to thereby reduce the iron loss and increase the strength of steel. In order to obtain such an effect, Cu, Ni and Cr are necessary to be added by not less than 0.01 mass % in total. However, the addition exceeding 1.0 mass % brings about increase not only in raw material cost but also in the iron loss. Therefore, when these elements are added, the total amount is preferable to fall within the range of 0.01 to 1.0 mass %. More preferably, it is within the range of 0.1 to 0.5 mass %.

There will be described a method for producing a non-oriented electrical steel sheet according to the invention below.

A non-oriented electrical steel sheet according to the invention can be produced by a series of steps of hot rolling a raw steel material (slab) having the above chemical composition to form a hot-rolled sheet, subjecting the hot-rolled sheet to a hot-band annealing, if necessary, and to a single cold rolling or two or more cold rollings having an intermediate annealing interposed therebetween to form a cold-rolled sheet having a final sheet thickness, subjecting the cold-rolled sheet to a finish annealing and applying an insulation coating to provide a product sheet, if necessary.

First, the slab as a raw steel material can be produced by subjecting steel melted in a convertor or an electric furnace to secondary refining in a degassing equipment or the like to have a given chemical composition, and then conducting a continuous casting method or an ingot making-blooming method.

Next, the slab is preferably reheated to a temperature of 1050 to 1150° C. (SRT) and then subjected to a hot rolling. When SRT exceeds 1150° C., precipitates of sulfide and nitride are finely divided to block the grain growth in the hot-band annealing and finish annealing, and the iron loss property is deteriorated. When SRT is lower than 1050° C., deformation resistance increases and the rolling load increases, and hence it is difficult to conduct the hot rolling. Moreover, the slab may be immediately subjected to hot rolling without reheating as long as the slab temperature after the continuous casting can maintain the above temperature or an end temperature of the finish rolling as mentioned later.

The hot rolling may be conducted under well-known conditions. When the hot-band annealing is not performed, it is preferable that the final pass of the finish rolling is conducted at a single-phase region and the end temperature of the finish rolling (FDT) is raised as high as possible, from a viewpoint of improving the magnetic properties. The preferable FDT falls within the temperature range of not lower than 800° C. but not more than transformation point.

The hot-band annealing, when it is conducted, is performed preferably at a temperature of 900 to 1100° C., from a viewpoint of improving the magnetic properties. Moreover, it is preferable to omit the hot-band annealing from a viewpoint of reducing the cost.

Next, the steel sheet after the hot rolling or after the hot-band annealing is subjected to a single cold rolling or two or more cold rollings having an intermediate annealing interposed therebetween to form a cold-rolled sheet having a final sheet thickness. The final sheet thickness in the cold rolling is not particularly defined but is preferable to be in the range of 0.10 to 0.50 mm. Moreover, it is more preferable to be in the range of 0.20 to 0.35 mm from a viewpoint of achieving both the low iron loss and the productivity.

Then, the cold-rolled sheet is subjected to finish annealing. The finish annealing is the most important process in the invention, and in order to reduce a nitrogen content after the finish annealing, it is important to control an atmosphere gas and a soaking temperature in the finish annealing to proper ranges.

Concretely, the atmosphere gas in the finish annealing is necessary to be one or a mixed gas of two or more selected from $N_2$ having a $N_2$ content of not more than 50 vol %, $H_2$ and noble gas (excluding impurities such as $H_2O$ and the like). For example, an atmosphere of $H_2$:$N_2$=80:20 in vol % ratio is preferable. Also, the dew point of the atmosphere gas is necessary to be not higher than −20° C. from a viewpoint of preventing oxidation of the steel sheet surface. Preferably, the $N_2$ content is not more than 40 vol % and the dew point is not higher than −40° C. Moreover, the control of the atmosphere in the finish annealing is conducted in sections where heating and soaking are conducted.

Furthermore, a soaking temperature T in the finish annealing is necessary to satisfy the following equation (1):

$$\frac{(8000+400\times \mathrm{Si(mass\ \%)})}{\{(-\log(\mathrm{Al(mass\ \%)}\times \mathrm{N(mass\ \%)})+1.7+0.2\times \mathrm{Si(mass\ \%)}\}}-273.15\le T\le 1200. \quad (1)$$

Here, the left side of the equation (1) represents a temperature (° C.) required for completely dissolving nitrides such as MN and $Si_3N_4$. When the soaking temperature T falls below the left side value of the equation (1), the nitrides finely precipitated in the finish annealing cannot be decomposed and dissolved into steel. When the soaking temperature T exceeds 1200° C., on the other hand, heat energy cost increases and heat load of the annealing equipment increased excessively, which is not favorable to the maintenance of the equipment. Preferably, T falls within the temperature range represented by the following equation (2):

$$\frac{(8100+400\times \mathrm{Si(mass\ \%)})}{\{(-\log(\mathrm{Al(mass\ \%)}\times \mathrm{N(mass\ \%)})+1.7+0.15\times \mathrm{Si(mass\ \%)}\}}-273.15\le T\le 1200 \qquad (2)$$

In the finish annealing conducted with satisfying the above conditions, when the nitrogen content in the raw steel material is not more than 0.0050 mass % (50 massppm), the nitrogen content in the steel sheet after the finish annealing can be stably reduced to not more than 0.0025 mass % (25 massppm).

Moreover, the finish annealing may be performed under vacuum or in a reduced-pressure atmosphere, instead of performing the aforementioned control of the atmosphere and soaking temperature. In this case, it is preferable that a vacuum degree is not more than $10^{-3}$ Pa and an annealing temperature T falls within the range of 950 to 1100° C.

The steel sheet after the finish annealing is coated with an insulation coating, if necessary, to provide a product sheet. Here, the insulation coating is preferable to be selected from inorganic coating, organic coating and inorganic and organic mixed coating appropriately according to its purpose.

EXAMPLES

Steel slabs A to NN having various chemical compositions shown in Table 1 are each heated to a temperature of 1120° C. for 30 minutes and hot rolled with a finish rolling end temperature FDT of 850° C. to form a hot-rolled sheet having a sheet thickness of 2.0 mm. Then, each hot-rolled sheet is subjected to a hot-band annealing under conditions shown in Table 2, pickled and cold rolled to form a cold-rolled sheet having a final sheet thickness, and thereafter the cold-rolled sheet is subjected to a finish annealing under conditions shown in Table 2 to provide a product sheet.

TABLE 1

| Steel | Chemical composition (mass %) | | | | | | | | | |
|---|---|---|---|---|---|---|---|---|---|---|
| symbol | C | Si | Mn | P | S | Al | Ti | Nb | O | N | Sn |
| A | 0.0022 | 2.3 | 0.1 | 0.01 | 0.0018 | 0.002 | 0.0011 | 0.0009 | 0.0024 | 0.0029 | — |
| B | 0.0025 | 3.5 | 0.1 | 0.01 | 0.0024 | 0.003 | 0.0008 | 0.0011 | 0.0021 | 0.0028 | — |
| C | 0.0025 | 3.5 | 0.5 | 0.01 | 0.0024 | 0.001 | 0.0008 | 0.0011 | 0.0021 | 0.0028 | — |
| D | 0.0025 | 3.5 | 1.4 | 0.01 | 0.0024 | 0.001 | 0.0008 | 0.0011 | 0.0021 | 0.0028 | — |
| E | 0.0025 | 3.5 | 2.5 | 0.01 | 0.0024 | 0.001 | 0.0008 | 0.0011 | 0.0021 | 0.0028 | — |
| F | 0.0025 | 3.3 | 0.1 | 0.01 | 0.0024 | 0.030 | 0.0008 | 0.0011 | 0.0021 | 0.0021 | — |
| G | 0.0019 | 4.2 | 0.1 | 0.01 | 0.0015 | 0.001 | 0.0014 | 0.0012 | 0.0019 | 0.0027 | — |
| H | 0.0038 | 6.5 | 0.1 | 0.01 | 0.0016 | 0.002 | 0.0013 | 0.0014 | 0.0023 | 0.0029 | — |
| I | 0.0022 | 7.2 | 0.1 | 0.01 | 0.0024 | 0.001 | 0.0008 | 0.0011 | 0.0021 | 0.0028 | — |
| J | 0.0026 | 3.2 | 0.1 | 0.05 | 0.0026 | 0.001 | 0.0011 | 0.0013 | 0.0028 | 0.0024 | — |
| K | 0.0026 | 3.2 | 0.1 | 0.10 | 0.0026 | 0.001 | 0.0011 | 0.0013 | 0.0028 | 0.0024 | — |
| L | 0.0026 | 3.2 | 0.1 | 0.25 | 0.0026 | 0.001 | 0.0011 | 0.0013 | 0.0028 | 0.0024 | — |
| M | 0.0017 | 3.2 | 0.1 | 0.01 | 0.0019 | 0.001 | 0.0016 | 0.0014 | 0.0027 | 0.0021 | 0.05 |
| N | 0.0017 | 3.2 | 0.1 | 0.01 | 0.0019 | 0.001 | 0.0016 | 0.0014 | 0.0027 | 0.0021 | — |
| O | 0.0017 | 3.2 | 0.1 | 0.01 | 0.0024 | 0.001 | 0.0016 | 0.0014 | 0.0027 | 0.0021 | — |
| P | 0.0017 | 3.2 | 0.1 | 0.01 | 0.0026 | 0.001 | 0.0016 | 0.0014 | 0.0027 | 0.0021 | — |
| Q | 0.0017 | 3.2 | 0.1 | 0.01 | 0.0027 | 0.001 | 0.0016 | 0.0014 | 0.0027 | 0.0021 | — |
| R | 0.0025 | 2.8 | 0.1 | 0.03 | 0.0019 | 0.004 | 0.0018 | 0.0013 | 0.0029 | 0.0026 | 0.04 |
| S | 0.0025 | 2.8 | 0.1 | 0.03 | 0.0058 | 0.004 | 0.0018 | 0.0013 | 0.0029 | 0.0026 | 0.04 |
| T | 0.0025 | 2.8 | 0.1 | 0.03 | 0.0015 | 0.004 | 0.0039 | 0.0013 | 0.0029 | 0.0026 | 0.04 |
| U | 0.0025 | 2.8 | 0.1 | 0.03 | 0.0015 | 0.004 | 0.0007 | 0.0037 | 0.0029 | 0.0026 | 0.04 |
| V | 0.0025 | 2.8 | 0.1 | 0.03 | 0.0015 | 0.004 | 0.0007 | 0.0011 | 0.0062 | 0.0026 | 0.04 |
| W | 0.0025 | 2.8 | 0.1 | 0.03 | 0.0015 | 0.004 | 0.0007 | 0.0011 | 0.0021 | 0.0063 | 0.04 |
| X | 0.0021 | 2.2 | 0.5 | 0.04 | 0.0024 | 0.001 | 0.0015 | 0.0011 | 0.0021 | 0.0032 | 0.05 |
| Y | 0.0026 | 3.2 | 0.8 | 0.01 | 0.0026 | 0.001 | 0.0015 | 0.0011 | 0.0021 | 0.0028 | 0.05 |
| Z | 0.0022 | 1.8 | 0.6 | 0.06 | 0.0019 | 0.001 | 0.0011 | 0.0009 | 0.0028 | 0.0027 | 0.04 |
| AA | 0.0022 | 2.6 | 1.5 | 0.01 | 0.0019 | 0.001 | 0.0011 | 0.0009 | 0.0028 | 0.0032 | 0.03 |
| BB | 0.0025 | 2.1 | 0.6 | 0.04 | 0.0021 | 0.001 | 0.0013 | 0.0013 | 0.0032 | 0.0031 | 0.05 |
| CC | 0.0024 | 2.9 | 1.3 | 0.01 | 0.0025 | 0.002 | 0.0014 | 0.0012 | 0.0029 | 0.0029 | 0.04 |
| DD | 0.0022 | 3.1 | 0.4 | 0.03 | 0.0019 | 0.001 | 0.0009 | 0.0011 | 0.0021 | 0.0032 | 0.04 |
| EE | 0.0023 | 3.3 | 0.4 | 0.03 | 0.0021 | 0.001 | 0.0011 | 0.0009 | 0.0022 | 0.0031 | 0.04 |
| FF | 0.0023 | 3.3 | 0.4 | 0.03 | 0.0022 | 0.001 | 0.0008 | 0.0010 | 0.0023 | 0.0031 | 0.04 |
| GG | 0.0026 | 3.3 | 0.4 | 0.03 | 0.0018 | 0.001 | 0.0012 | 0.0011 | 0.0021 | 0.0030 | 0.04 |
| HH | 0.0019 | 3.4 | 0.4 | 0.03 | 0.0017 | 0.001 | 0.0011 | 0.0013 | 0.0025 | 0.0029 | 0.04 |
| II | 0.0018 | 3.4 | 0.4 | 0.03 | 0.0023 | 0.001 | 0.0007 | 0.0012 | 0.0024 | 0.0028 | 0.04 |
| JJ | 0.0021 | 3.4 | 0.4 | 0.03 | 0.0022 | 0.001 | 0.0009 | 0.0011 | 0.0023 | 0.0028 | 0.04 |
| KK | 0.0024 | 3.1 | 0.2 | 0.05 | 0.0019 | 0.001 | 0.0009 | 0.0007 | 0.0021 | 0.0029 | 0.03 |
| LL | 0.0023 | 3.1 | 0.2 | 0.05 | 0.0014 | 0.001 | 0.0008 | 0.0009 | 0.0023 | 0.0028 | 0.03 |
| MM | 0.0025 | 3.1 | 0.2 | 0.05 | 0.0016 | 0.001 | 0.0008 | 0.0008 | 0.0021 | 0.0031 | 0.03 |
| NN | 0.0029 | 2.4 | 0.1 | 0.02 | 0.0019 | 0.003 | 0.0011 | 0.0009 | 0.0024 | 0.0032 | — |

| Steel | Chemical composition (mass %) | | | | | | | |
|---|---|---|---|---|---|---|---|---|
| symbol | Sb | Ca | Mg | REM | Cu | Ni | Cr | Remarks |
| A | — | — | — | — | — | — | — | Invention steel |
| B | — | — | — | — | — | — | — | Invention steel |
| C | — | — | — | — | — | — | — | Invention steel |
| D | — | — | — | — | — | — | — | Invention steel |
| E | — | — | — | — | — | — | — | Comparative steel |
| F | — | — | — | — | — | — | — | Comparative steel |
| G | — | — | — | — | — | — | — | Invention steel |
| H | — | — | — | — | — | — | — | Invention steel |

TABLE 1-continued

| | | | | | | | | |
|---|---|---|---|---|---|---|---|---|
| I | — | — | — | — | — | — | — | Comparative steel |
| J | — | — | — | — | — | — | — | Invention steel |
| K | — | — | — | — | — | — | — | Invention steel |
| L | — | — | — | — | — | — | — | Comparative steel |
| M | — | — | — | — | — | — | — | Invention steel |
| N | 0.08 | — | — | — | — | — | — | Invention steel |
| O | — | 0.0034 | — | — | — | — | — | Invention steel |
| P | — | — | 0.0025 | — | — | — | — | Invention steel |
| Q | — | — | — | 0.0072 | — | — | — | Invention steel |
| R | 0.04 | — | — | — | — | — | — | Invention steel |
| S | 0.04 | — | — | — | — | — | — | Comparative steel |
| T | 0.04 | — | — | — | — | — | — | Comparative steel |
| U | 0.04 | — | — | — | — | — | — | Comparative steel |
| V | 0.04 | — | — | — | — | — | — | Comparative steel |
| W | 0.04 | — | — | — | — | — | — | Comparative steel |
| X | — | — | — | — | — | — | — | Invention steel |
| Y | — | — | — | — | — | — | — | Invention steel |
| Z | — | — | — | — | — | — | — | Invention steel |
| AA | — | — | — | — | — | — | — | Invention steel |
| BB | — | 0.0029 | — | — | — | — | — | Invention steel |
| CC | — | 0.0035 | — | — | — | — | — | Invention steel |
| DD | — | — | — | — | 0.30 | — | — | Invention steel |
| EE | — | — | — | — | — | 0.20 | — | Invention steel |
| FF | — | — | — | — | — | — | 0.50 | Invention steel |
| GG | — | — | — | — | 0.10 | — | 0.40 | Invention steel |
| HH | — | — | — | — | 0.10 | 0.10 | — | Invention steel |
| II | — | — | — | — | — | 0.10 | 0.40 | Invention steel |
| JJ | — | — | — | — | 0.10 | 0.10 | 0.10 | Invention steel |
| KK | — | — | — | — | 0.02 | 0.03 | — | Invention steel |
| LL | — | — | — | — | — | 0.05 | 0.05 | Invention steel |
| MM | — | — | — | — | 0.50 | — | 0.60 | Comparative steel |
| NN | — | — | — | — | — | — | — | Invention steel |

From the obtained product sheet after the finish annealing, test specimens with a width of 30 mm and a length of 280 mm are taken out in the rolling direction (L-direction) and the direction perpendicular to the rolling direction (C-direction) to measure an iron loss $W_{15/50}$ by an Epstein test. Also, the nitrogen content in steel of the test specimen is measured after the measurement of the iron loss.

Table 2 shows the results of the above measurement, together with the production conditions. As seen from these results, the nitrogen content in all the steel sheet, which are produced by using the raw steel materials having a chemical composition adapted to the invention and under the production conditions adapted to the invention, is lower than that at the stage as the raw steel material, and an excellent iron loss property.

TABLE 2

| Steel | | Hot-band annealing conditions | | Thickness of cold-rolled | Left side | Finish annealing conditions | | |
|---|---|---|---|---|---|---|---|---|
| sheet No. | Steel symbol | Temperature (° C.) | Time (sec) | sheet (mm) | of Eq. (1) (° C.) | Temperature (° C.) | Time (sec) | Atmosphere gas (vol %) |
| 1 | A | 1000 | 30 | 0.35 | 933 | 1000 | 10 | N2:H2 = 20:80 |
| 2 | A | 1000 | 30 | 0.30 | 933 | 1000 | 10 | N2:H2 = 20:80 |
| 3 | A | 1000 | 30 | 0.25 | 933 | 1000 | 10 | N2:H2 = 20:80 |
| 4 | A | 1000 | 30 | 0.20 | 933 | 1000 | 10 | N2:H2 = 20:80 |
| 5 | A | 1000 | 30 | 0.15 | 933 | 1000 | 10 | N2:H2 = 20:80 |
| 6 | A | 1000 | 30 | 0.30 | 933 | 1000 | 10 | N2 = 100 |
| 7 | A | 1050 | 30 | 0.25 | 933 | 1020 | 10 | H2 = 100 |
| 8 | A | 1050 | 30 | 0.25 | 933 | 1025 | 10 | Ar = 100 |
| 9 | A | 1050 | 30 | 0.25 | 933 | 1025 | 10 | H2 = 100 |
| 10 | A | 1050 | 30 | 0.25 | 933 | 1020 | 10 | He = 100 |
| 11 | B | 980 | 30 | 0.30 | 984 | 1025 | 10 | H2:Ar = 20:80 |
| 12 | C | 970 | 30 | 0.30 | 909 | 1000 | 10 | H2:Ar = 20:80 |
| 13 | D | 940 | 30 | 0.30 | 909 | 1000 | 10 | H2:Ar = 20:80 |
| 14 | E | — | — | — | — | — | — | — |
| 15 | F | 1000 | 30 | 0.30 | 1147 | 1100 | 10 | N2:He = 20:80 |
| 16 | G | 920 | 30 | 0.25 | 921 | 1000 | 10 | H2 = 100 |
| 17 | H | 900 | 30 | 0.15 | 1014 | 1150 | 30 | H2 = 100 |
| 18 | I | — | — | — | — | — | — | — |
| 19 | J | 1000 | 30 | 0.30 | 893 | 1000 | 10 | N2:H2 = 10:90 |
| 20 | K | 1000 | 30 | 0.30 | 893 | 1000 | 10 | N2:H2 = 10:90 |
| 21 | L | 1000 | 30 | — | — | — | — | — |
| 22 | M | 1020 | 30 | 0.35 | 884 | 1000 | 10 | N2:H2 = 10:90 |
| 23 | N | 1020 | 30 | 0.35 | 884 | 1000 | 10 | N2:H2 = 10:90 |
| 24 | O | 1020 | 30 | 0.35 | 884 | 1000 | 10 | N2:H2 = 10:90 |
| 25 | P | 1020 | 30 | 0.35 | 884 | 1000 | 10 | N2:H2 = 10:90 |
| 26 | Q | 1020 | 30 | 0.35 | 884 | 1000 | 10 | N2:H2 = 10:90 |

TABLE 2-continued

| | | | | | | | | |
|---|---|---|---|---|---|---|---|---|
| 27 | R | 1000 | 30 | 0.25 | 986 | 950 | 10 | He = 100 |
| 28 | S | 1000 | 30 | 0.25 | 986 | 1000 | 10 | He = 100 |
| 29 | T | 1000 | 30 | 0.25 | 986 | 1000 | 10 | He = 100 |
| 30 | U | 1000 | 30 | 0.25 | 986 | 1000 | 10 | He = 100 |
| 31 | V | 1000 | 30 | 0.25 | 986 | 1000 | 10 | He = 100 |
| 32 | W | 1000 | 30 | 0.25 | 1057 | 1100 | 10 | He = 100 |
| 33 | X | Not conducted | | 0.35 | 890 | 980 | 10 | Ar = 100 |
| 34 | X | Not conducted | | 0.25 | 890 | 980 | 10 | H2:Ar = 20:80 |
| 35 | Y | Not conducted | | 0.30 | 903 | 1000 | 10 | N2:H2 = 20:80 |
| 36 | Y | Not conducted | | 0.20 | 903 | 1000 | 10 | N2:H2 = 20:80 |
| 37 | Z | Not conducted | | 0.35 | 870 | 1000 | 10 | Ar = 100 |
| 38 | AA | Not conducted | | 0.30 | 899 | 1000 | 10 | N2:H2 = 10:90 |
| 39 | BB | Not conducted | | 0.35 | 886 | 980 | 10 | H2:Ar = 10:90 |
| 40 | CC | Not conducted | | 0.30 | 945 | 990 | 10 | H2:Ar = 10:90 |
| 41 | DD | 1000 | 30 | 0.25 | 909 | 1000 | 10 | H2:Ar = 20:80 |
| 42 | EE | 1000 | 30 | 0.25 | 911 | 1000 | 10 | H2:Ar = 20:80 |
| 43 | FF | 1000 | 30 | 0.25 | 911 | 1000 | 10 | H2:Ar = 20:80 |
| 44 | GG | 1000 | 30 | 0.25 | 909 | 1000 | 10 | H2:Ar = 20:80 |
| 45 | HH | 1000 | 30 | 0.25 | 909 | 1000 | 10 | H2:Ar = 20:80 |
| 46 | II | 1000 | 30 | 0.25 | 907 | 1000 | 10 | H2:Ar = 20:80 |
| 47 | JJ | 1000 | 30 | 0.25 | 907 | 1000 | 10 | H2:Ar = 20:80 |
| 48 | KK | 1000 | 30 | 0.25 | 903 | 1000 | 10 | H2:Ar = 20:80 |
| 49 | LL | 1000 | 30 | 0.25 | 901 | 1000 | 10 | H2:Ar = 20:80 |
| 50 | MM | 1000 | 30 | 0.25 | 907 | 1000 | 10 | H2:Ar = 20:80 |
| 51 | NN | 1000 | 30 | 0.30 | 972 | 1000 | 10 | N2:H2 = 40:60 |
| 52 | NN | 1000 | 30 | 0.30 | 967 | 1000 | 10 | N2:H2 = 60:40 |
| 53 | NN | 1000 | 30 | 0.30 | 972 | 1000 | 10 | N2:H2 = 20:80 |
| 54 | NN | 1000 | 30 | 0.30 | 967 | 1000 | 10 | N2:H2 = 30:70 |

| Steel sheet No. | Finish annealing conditions Dew point (° C.) | N content (mass %) After finish annealing | Increase/decrease amount to raw steel material | Iron loss $W_{15/50}$ (W/kg) | Remarks |
|---|---|---|---|---|---|
| 1 | −50 | 0.0021 | −0.0008 | 2.10 | Invention Example |
| 2 | −50 | 0.0019 | −0.0010 | 2.02 | Invention Example |
| 3 | −50 | 0.0018 | −0.0011 | 1.93 | Invention Example |
| 4 | −50 | 0.0017 | −0.0012 | 1.85 | Invention Example |
| 5 | −50 | 0.0015 | −0.0014 | 1.82 | Invention Example |
| 6 | −50 | 0.0029 | 0 | 2.48 | Comparative Example |
| 7 | −50 | 0.0014 | −0.0015 | 1.85 | Invention Example |
| 8 | −50 | 0.0014 | −0.0015 | 1.85 | Invention Example |
| 9 | −5 | 0.0028 | −0.0001 | 2.45 | Comparative Example |
| 10 | −45 | 0.0014 | −0.0015 | 1.84 | Invention Example |
| 11 | −50 | 0.0015 | −0.0013 | 1.97 | Invention Example |
| 12 | −50 | 0.0015 | −0.0013 | 1.93 | Invention Example |
| 13 | −50 | 0.0015 | −0.0013 | 1.90 | Invention Example |
| 14 | — | — | — | — | Comparative Example |
| 15 | −40 | 0.0021 | 0 | 2.39 | Comparative Example |
| 16 | −45 | 0.0017 | −0.0010 | 1.87 | Invention Example |
| 17 | −40 | 0.0012 | −0.0017 | 1.51 | Invention Example |
| 18 | — | — | — | — | Comparative Example |
| 19 | −50 | 0.0015 | −0.0009 | 1.90 | Invention Example |
| 20 | −50 | 0.0015 | −0.0009 | 1.88 | Invention Example |
| 21 | — | — | — | — | Comparative Example |
| 22 | −55 | 0.0014 | −0.0007 | 1.92 | Invention Example |
| 23 | −58 | 0.0015 | −0.0006 | 1.90 | Invention Example |
| 24 | −60 | 0.0014 | −0.0007 | 1.92 | Invention Example |
| 25 | −60 | 0.0014 | −0.0007 | 1.91 | Invention Example |
| 26 | −60 | 0.0014 | −0.0007 | 1.91 | Invention Example |
| 27 | −50 | 0.0026 | 0 | 2.41 | Comparative Example |
| 28 | −50 | 0.0022 | −0.0004 | 2.45 | Comparative Example |
| 29 | −50 | 0.0023 | −0.0003 | 2.48 | Comparative Example |
| 30 | −50 | 0.0023 | −0.0003 | 2.48 | Comparative Example |
| 31 | −50 | 0.0022 | −0.0004 | 2.46 | Comparative Example |
| 32 | −50 | 0.0051 | −0.0012 | 2.51 | Comparative Example |
| 33 | −54 | 0.0019 | −0.0013 | 2.05 | Invention Example |
| 34 | −54 | 0.0018 | −0.0014 | 1.95 | Invention Example |
| 35 | −59 | 0.0018 | −0.0010 | 2.01 | Invention Example |
| 36 | −59 | 0.0015 | −0.0013 | 1.92 | Invention Example |
| 37 | −60 | 0.0014 | −0.0013 | 2.02 | Invention Example |
| 38 | −55 | 0.0018 | −0.0014 | 1.92 | Invention Example |
| 39 | −50 | 0.0019 | −0.0012 | 2.03 | Invention Example |
| 40 | −55 | 0.0017 | −0.0012 | 1.93 | Invention Example |
| 41 | −55 | 0.0017 | −0.0015 | 1.89 | Invention Example |
| 42 | −55 | 0.0018 | −0.0013 | 1.85 | Invention Example |
| 43 | −55 | 0.0018 | −0.0013 | 1.84 | Invention Example |
| 44 | −55 | 0.0017 | −0.0013 | 1.83 | Invention Example |
| 45 | −55 | 0.0016 | −0.0013 | 1.82 | Invention Example |

TABLE 2-continued

| | | | | | |
|---|---|---|---|---|---|
| 46 | −55 | 0.0016 | −0.0012 | 1.82 | Invention Example |
| 47 | −55 | 0.0017 | −0.0011 | 1.81 | Invention Example |
| 48 | −50 | 0.0018 | −0.0011 | 1.95 | Invention Example |
| 49 | −50 | 0.0017 | −0.0011 | 1.92 | Invention Example |
| 50 | −50 | 0.0020 | −0.0011 | 2.31 | Comparative Example |
| 51 | −50 | 0.0022 | −0.0010 | 2.07 | Invention Example |
| 52 | −50 | 0.0027 | −0.0005 | 2.26 | Comparative Example |
| 53 | −25 | 0.0023 | −0.0009 | 2.08 | Invention Example |
| 54 | −15 | 0.0028 | −0.0004 | 2.29 | Comparative Example |

* Slab cracking is caused in steel sheet No. 14 having a high Mn content and steel sheet No. 18 having a high Si content, so that the product cannot be provided.
* Breakage is caused in steel sheet No. 21 having a high P content, so that the product cannot be provided.

INDUSTRIAL APPLICABILITY

It is possible to reduce the iron loss of the steel sheet according to the invention without causing the magnetic flux density to lower, so that the steel sheet can be preferably used as not only an iron core material of a driving motor for hybrid electric vehicles (HEV), electric vehicles driven only by an electric motor (EV) and fuel cell vehicles (FCEV) but also an iron core material of a motor for air compressor, machine tools, high-speed generator, cleaner and so on.

The invention claimed is:

1. A method for producing a non-oriented electrical steel sheet comprising:

hot rolling a steel slab having a chemical composition comprising C: not more than 0.0050 mass %, Si: 1.0 to 6.5 mass %, Mn: 0.05 to 2.0 mass %, S: not more than 0.0050 mass %, Al: not more than 0.01 mass %, N: 0.0031 to 0.0050 mass %, Ti: not more than 0.0030 mass %, Nb: not more than 0.0030 mass %, 0: not more than 0.0050 mass % and the remainder being Fe and inevitable impurities, subjecting the hot-rolled sheet to a single cold rolling or two or more cold rollings having an intermediate annealing interposed therebetween to have a final sheet thickness, and to a finish annealing, wherein a soaking temperature T (° C.) in the finish annealing satisfies the following equation (1):

$$\frac{(8000+400\times \mathrm{Si(mass\ \%)})}{\{(-\log(\mathrm{Al(mass\ \%)}\times \mathrm{N(mass\ \%)}))+1.7+0.2\times \mathrm{Si(mass\ \%)}\}}-273.15\le T\le 1200, \quad (1)$$

an atmosphere in the finish annealing is a mixed gas containing one or more selected from $N_2$, $H_2$ and a noble gas and having a $N_2$ content of not more than 50 vol % and a dew point of the atmosphere of not higher than −45° C., and wherein an amount of N in the steel sheet after the finish annealing is lower than the amount of N in the steel slab by at least 0.0006 mass %.

2. The method for producing a non-oriented electrical steel sheet according to claim 1, wherein the steel slab contains P: 0.03 to 0.20 mass %, in addition to the above chemical composition.

3. The method for producing a non-oriented electrical steel sheet according to claim 1, wherein the steel slab contains one or two selected from Sn: 0.005 to 0.20 mass % and Sb: 0.005 to 0.20 mass %, in addition to the above chemical composition.

4. The method for producing a non-oriented electrical steel sheet according to claim 1, wherein the steel slab contains one or more selected from Ca, Mg and REM by 0.0005 to 0.020 mass % in total, in addition to the above chemical composition.

5. The method for producing a non-oriented electrical steel sheet according to claim 1, wherein the steel slab contains one or more selected from Cu, Ni and Cr by 0.01 to 1.0 mass %, in addition to the above chemical composition.

6. The method for producing a non-oriented electrical steel sheet according to claim 2, wherein the steel slab contains one or two selected from Sn:

0.005 to 0.20 mass % and Sb: 0.005 to 0.20 mass %, in addition to the above chemical composition.

7. The method for producing a non-oriented electrical steel sheet according to claim 2, wherein the steel slab contains one or more selected from Ca, Mg and REM by 0.0005 to 0.020 mass % in total, in addition to the above chemical composition.

8. The method for producing a non-oriented electrical steel sheet according to claim 3, wherein the steel slab contains one or more selected from Ca, Mg and REM by 0.0005 to 0.020 mass % in total, in addition to the above chemical composition.

9. The method for producing a non-oriented electrical steel sheet according to claim 6, wherein the steel slab contains one or more selected from Ca, Mg and REM by 0.0005 to 0.020 mass % in total, in addition to the above chemical composition.

10. The method for producing a non-oriented electrical steel sheet according to claim 2, wherein the steel slab contains one or more selected from Cu, Ni and Cr by 0.01 to 1.0 mass %, in addition to the above chemical composition.

11. The method for producing a non-oriented electrical steel sheet according to claim 3, wherein the steel slab contains one or more selected from Cu, Ni and Cr by 0.01 to 1.0 mass %, in addition to the above chemical composition.

12. The method for producing a non-oriented electrical steel sheet according to claim 4, wherein the steel slab contains one or more selected from Cu, Ni and Cr by 0.01 to 1.0 mass %, in addition to the above chemical composition.

13. The method for producing a non-oriented electrical steel sheet according to claim 6, wherein the steel slab contains one or more selected from Cu, Ni and Cr by 0.01 to 1.0 mass %, in addition to the above chemical composition.

14. The method for producing a non-oriented electrical steel sheet according to claim 7, wherein the steel slab contains one or more selected from Cu, Ni and Cr by 0.01 to 1.0 mass %, in addition to the above chemical composition.

15. The method for producing a non-oriented electrical steel sheet according to claim 8, wherein the steel slab contains one or more selected from Cu, Ni and Cr by 0.01 to 1.0 mass %, in addition to the above chemical composition.

16. The method for producing a non-oriented electrical steel sheet according to claim 9, wherein the steel slab contains one or more selected from Cu, Ni and Cr by 0.01 to 1.0 mass %, in addition to the above chemical composition.

17. The method for producing a non-oriented electrical steel sheet according to claim 1, wherein after the finish annealing, the steel sheet contains N in an amount that is in a range of from 0.0022 mass % or less.

18. The method for producing a non-oriented electrical steel sheet according to claim 1, wherein after the finish annealing, the steel sheet contains N in an amount that is in a range of from 0.0012 mass % to 0.0021 mass %.

19. The method for producing a non-oriented electrical steel sheet according to claim 1, wherein the amount of N in the steel sheet after the finish annealing is lower than the amount of N in the steel slab by an amount that is in a range of from 0.0006 mass % to 0.0017 mass %.

20. The method for producing a non-oriented electrical steel sheet according to claim 1, wherein the amount of N in the steel slab is from 0.0032 to 0.0050 mass %.

21. The method for producing a non-oriented electrical steel sheet according to claim 1, wherein the soaking temperature T (° C.) in the finish annealing satisfies the following equation (2):

$$\frac{(8100+400\times Si(mass\ \%))}{\{(-\log(Al(mass\ \%)\times N(mass\ \%))+1.7+0.15\times Si(mass\ \%)\}}-273.15\leq T\leq 1200. \tag{2}$$

* * * * *